(12) United States Patent
Morita et al.

(10) Patent No.: US 8,744,364 B2
(45) Date of Patent: Jun. 3, 2014

(54) WIRELESS STATION APPARATUS, WIRELESS COMMUNICATION SYSTEM, AND WIRELESS COMMUNICATION CONTROL METHOD

(75) Inventors: Motoki Morita, Tokyo (JP); Takashi Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 559 days.

(21) Appl. No.: 13/129,336

(22) PCT Filed: Oct. 30, 2009

(86) PCT No.: PCT/JP2009/068673
§ 371 (c)(1),
(2), (4) Date: May 13, 2011

(87) PCT Pub. No.: WO2010/061713
PCT Pub. Date: Jun. 3, 2010

(65) Prior Publication Data
US 2011/0256859 A1  Oct. 20, 2011

(30) Foreign Application Priority Data

Nov. 26, 2008 (JP) ................................. 2008-300960

(51) Int. Cl.
*H04B 15/00* (2006.01)
(52) U.S. Cl.
USPC ........................................................ 455/63.4
(58) Field of Classification Search
CPC ........................................................ H04B 7/086
USPC ........................................................ 455/63.4
See application file for complete search history.

(56) References Cited

U.S. PATENT DOCUMENTS

| | | | |
|---|---|---|---|
| 2004/0106436 A1 | 6/2004 | Ochi et al. | |
| 2006/0183426 A1* | 8/2006 | Graves et al. | 455/63.1 |
| 2011/0009147 A1* | 1/2011 | Morita et al. | 455/509 |
| 2011/0051684 A1* | 3/2011 | Li et al. | 370/331 |
| 2012/0155341 A1* | 6/2012 | Yamamoto et al. | 370/281 |

FOREIGN PATENT DOCUMENTS

| | | |
|---|---|---|
| CN | 1159261 A | 9/1997 |
| CN | 1489416 A | 4/2004 |
| CN | 1574713 A | 2/2005 |
| CN | 1756409 A | 4/2006 |

(Continued)

OTHER PUBLICATIONS

International Search Report for PCT/JP2009/068673 mailed Dec. 8, 2009.

(Continued)

*Primary Examiner* — David Bilodeau
(74) *Attorney, Agent, or Firm* — Sughrue Mion, PLLC

(57) ABSTRACT

A wireless station apparatus is proposed that solves the problem of deterioration of communication quality. An arrival direction detection unit (13) detects the direction of arrival of uplink signals received by a wireless receiver (11). A mobile station determination unit (12) determines whether the transmission-origin mobile station of the uplink signals that are received by the wireless receiver (11) is a permitted mobile station or a nonpermitted mobile station. Based on the uplink signals received by the wireless receiver (11) and the determination result of the mobile station determination unit (12), an antenna adjustment unit (14) finds the degree of interference of permitted mobile stations and nonpermitted mobile stations in the direction of arrival that was detected in the arrival direction detection unit (13). The antenna adjustment unit (14) adjusts the direction of directivity of the reception antenna (10) in accordance with the degree of interference that was found.

57 Claims, 6 Drawing Sheets

(56) References Cited

FOREIGN PATENT DOCUMENTS

| | | |
|---|---|---|
| CN | 1980450 A | 6/2007 |
| JP | 2002016669 A | 1/2002 |
| JP | 2002186018 A | 6/2002 |
| JP | 2002300105 A | 10/2002 |
| JP | 2003218772 A | 7/2003 |
| JP | 2003283418 A | 10/2003 |
| JP | 2003284126 A | 10/2003 |
| JP | 2007028091 A | 2/2007 |
| JP | 2008048107 A | 2/2008 |
| JP | 2008270940 A | 11/2008 |
| WO | 2008136429 A | 11/2006 |

OTHER PUBLICATIONS

3GPP TS 25.214 V7.3.0, Technical Specification Group Radio Access Network; Physical layer procedures (FDD) (Release 7), Dec. 2006.

3GPP TS 36.300 V8.1.0, Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Jun. 2007.

Chinese Office Action for CN Application No. 200980147290.X issued on May 23, 2013 with English Translation.

* cited by examiner

US 8,744,364 B2

WIRELESS STATION APPARATUS, WIRELESS COMMUNICATION SYSTEM, AND WIRELESS COMMUNICATION CONTROL METHOD

TECHNICAL FIELD

The present invention relates to a wireless station apparatus, a wireless communication system, a wireless communication control method, and a program, and more particularly relates to a wireless station apparatus that has an antenna whose direction of directivity can be adjusted, a wireless communication system, a wireless communication control method, and a program.

BACKGROUND ART

With the popularization of portable telephones in recent years, demand is increasing for speech communication and data communication that uses mobile stations such as portable telephones not only outdoors but indoors as well. To meet this increasing demand, ultra-compact base stations are being developed that can be set up indoors, such as in users' residences or small-scale offices. Because the cells of these base stations are extremely small compared to the cells of base stations that are set up outdoors, they are referred to as femtocells. These ultra-compact base stations are called femto base stations.

As the operating form of these femto base stations, forms have been proposed in which only pre-registered mobile stations are able to connect to the femto base stations and perform communication.

FIG. 1 is a block diagram showing a wireless communication system that includes a femto base station.

In FIG. 1, femto base station 101 forms femtocell 102 and connects to network 105 by way of femto-GW (Gateway) 104. Mobile station 103-1 is registered in femto base station 101 and is permitted to connect with femto base station 101. Mobile station 103-2 is not registered in femto base station 101 and is not permitted to connect with femto base station 101. In the following explanation, mobile stations that are registered in femto base station 101 including mobile station 103-1 are also referred to as registered mobile stations (or registered wireless stations). In addition, mobile stations that are registered in femto base station 101 including mobile station 103-2 are also referred to as nonregistered mobile stations (or nonregistered wireless stations).

When in femtocell 102 of femto base station 101, a registered mobile station is able to connect with network 105 by way of femto base station 101.

Apart from this case, a base station in a mobile communication system transmits pilot signals within the cell of its own base station. Upon receiving these pilot signals, a mobile station transmits, for example, a connection request signal to the base station, carries out processes such as establishing synchronization and estimating channels, and connects to the base station. As a result, the base station, by taking action such that the mobile station is able to receive pilot signals with good quality, is able to offer good communication quality. The situation is the same in a femto base station.

In a mobile communication system, the radio wave (desired wave) of a mobile station that is the communication destination of a base station may receive interference from the radio waves of other mobile stations. To suppress this type of interference, a directional antenna may be applied in the transmission/reception antenna in the mobile communication system to raise the circuit capacity of the mobile communication system.

As a directional antenna, an adaptive array antenna has been proposed in which a plurality of antenna elements are aligned in array form that can dynamically alter directivity in concert with changes in the radio-wave environment. In an adaptive array antenna, the signal from each antenna element undergoes a weighting process that controls amplitude and phase and is then synthesized to enable directing the point at which the directivity is maximum (main beam) in the direction of the desired wave or directing the point at which the directivity falls (null) in the direction of interference waves.

The technology that enables this dynamic alteration of directivity matched to changes in the radio-wave environment includes the base station apparatus described in Patent Document 1.

In this base station apparatus, cells are divided into a plurality of sectors. The base station apparatus detects traffic, which is the number of mobile stations present in each of these sectors. The base station apparatus increases directivity in the direction of the sectors having greater traffic. Because directivity can thus be increased in the direction in which there are more desired waves, interference can be suppressed.

In contrast, in a femto base station, a non-directional antenna is normally applied such that one room can be covered by one apparatus.

The use of a femto base station in a W-CDMA (Wideband Code Division Multiple Access) or E-UTRA (Evolved Universal Terrestrial Radio Access) system has been proposed. E-UTRA is referred to as LTE (Long Term Evolution).

When a femto base station is used in W-CDMA, data transmission that uses individual channels that are subjected to transmission power control in uplink circuits and downlink circuits and data transmission that uses common channels in downlink circuits are carried out as described in 3GPP TS 25.214 V7.3.0. When a femto base station is used in E-UTRA, the wireless frequency band is divided into a plurality of resource blocks (PRB: Physical Resource Block) as described in 3GPP TS 36.300 V8.1.0. The scheduler provided in the femto base station then assigns the resource blocks and data transmission is carried out using these assigned resource blocks.

LITERATURE OF THE PRIOR ART

Patent Documents

Patent Document 1: Japanese Patent Laid-open No. 2003-283418

SUMMARY OF THE INVENTION

Problem to be Solved by the Invention

As shown in FIG. 2A, a case is considered in which femto base stations 91A and 92A are installed in two respective rooms divided by wall 90A in the same building.

Femto base stations 91A and 92A are installed in the vicinity of the center of each respective room. In addition, femto base station 91A forms femtocell 95A and femto base station 92A forms femtocell 96A.

Mobile station 93A is assumed to be registered in femto base station 91A but is not registered in femto base station 92A. As a result, mobile station 93A is able to connect to femto base station 91A and perform communication, but is not able to connect to femto base station 92A and perform communication.

On the other hand, mobile station 94A is not registered in femto base station 91A, but is registered in femto base station 92A. As a result, mobile station 94A is not able to connect to femto base station 91A and perform communication but is able to connect to femto base station 92A and perform communication.

As a result, even if femto base stations 91A and 92A use the same frequency band to carry out communication with mobile stations, almost no interference will occur. The reason for this state is as described below.

Even if mobile station 93A is located close to wall 90A, femto base station 92A is installed far from wall 90A and the distance attenuation of the interference waves is comparatively great. In addition, transmission loss of the interference waves occurs due to wall 90A. As a result, the downlink circuit signal transmitted by femto base station 92A causes hardly any interference to the downlink circuit signal received by mobile station 93A from femto base station 91A.

Next, as shown in FIG. 2B, a case is considered in which femto base stations 91B and 92B are installed in respective rooms separated by wall 90B of the same building. Femto base stations 91B and 92B are installed close to the walls of the rooms. In addition, femto base station 91B forms femtocell 95B and femto base station 92B forms femtocell 96B.

Mobile station 93B is assumed to be registered in femto base station 91B but not registered in femto base station 92B. As a result, mobile station 93B is able to connect to femto base station 91B to perform communication but is not able to connect to femto base station 92B to perform communication.

On the other hand, mobile station 94B is not registered in femto base station 91B but is registered in femto base station 92B. As a result, mobile station 94B is unable to connect to femto base station 91B to perform communication, but is able to connect to femto base station 92B to perform communication.

In this case, interference may occur when femto base stations 91B and 92B use the same frequency band to communication with mobile stations. This occurs for the following reasons.

When mobile station 93B is located close to wall 90B, the downlink circuit signal transmitted by femto base station 92B becomes interference waves for the downlink circuit signals received by mobile station 93B from femto base station 91B because femto base station 92B is installed close to wall 90B.

As a result, the quality of downlink circuit signals received by mobile station 93B from femto base station 91B deteriorate in.

In contrast, the uplink circuit signal transmitted by mobile station 93B becomes interference waves for the uplink circuit signals received by femto base station 92B from mobile station 94B. As a result, the quality of the uplink circuit signal received by femto base station 92B from mobile station 94B deteriorates in quality.

As described hereinabove, when femto base stations are installed in adjacent rooms, the influence of interference changes between the adjacent rooms according to the location where the femto base stations are installed. For example, the deterioration in communication quality caused by interference is pronounced when the femto base stations are installed close to walls, but the communication quality experiences little deterioration due to interference when the femto base stations are installed at a distance from walls.

Accordingly, the problem occurs in which femto base stations experience deterioration in communication quality due to radio-wave interference of wireless stations for which connection is permitted and wireless stations for which connection is denied.

This problem is not limited to the case of wireless communication systems that use femto base stations but rather, occurs in typical wireless communication systems having wireless stations for which connection is permitted and wireless stations for which connection is denied. For example, this problem also occurs in wireless ad hoc networks in which a plurality of wireless stations form an autonomous network.

In the base station apparatus described in Patent Document 1, the directivity of an antenna is adjusted according to traffic, which is the number of mobile stations. As a result, wireless stations for which connection is permitted and wireless stations for which connection is not permitted cannot be distinguished in this base station apparatus. Accordingly, in some cases, directivity in a direction in which there are many wireless stations for which connection is not permitted and few wireless stations for which connection is permitted increases and the interference exerted by wireless stations for which connection is not permitted upon wireless stations for which connection is permitted also increases. As a result, the deterioration of communication quality cannot be suppressed in the base station apparatus described in Patent Document 1.

It is an object of the present invention to provide a wireless station apparatus, a wireless communication system, a wireless communication control method, and a program that solve the above-described problem of deterioration in communication quality.

Means for Solving the Problem

The wireless station apparatus according to the present invention includes: an antenna for which the direction of directivity can be adjusted; communication means that receives signals by way of the antenna; detection means that detects the direction of arrival of signals that are received by the communication means; determination means that determines whether the transmission origin of a signal that is received by the communication means is a permitted wireless station apparatus for which connection is permitted or a nonpermitted wireless station apparatus for which connection is not permitted; and adjustment means that, based on signals received by the communication means and the determination results of the determination means, finds the degree of interference of the permitted wireless station apparatuses and the nonpermitted wireless station apparatuses in the direction of arrival detected in the detection means and adjusts the direction of directivity of the antenna according to the degree of interference that was found.

The wireless communication system according to the present invention is a wireless communication system that includes a first wireless station apparatus and a second wireless station apparatus, wherein the first wireless station apparatus includes transmission means that transmits signals, and the second wireless station apparatus includes an antenna for which the direction of directivity can be adjusted, communication means that receives signals by way of the antenna, detection means that detects the direction of arrival of signals that are received by the communication means, determination means that determines whether the transmission origin of signals that are received by the communication means is a permitted wireless station apparatus for which connection is permitted or a nonpermitted wireless station apparatus for which connection is not permitted, and adjustment means that, based on signals received by the communication means and the determination results of the determination means, finds the degree of interference of the permitted wireless station apparatuses and the nonpermitted wireless station apparatuses in the direction of arrival that was detected in the detection means and adjusts the direction of directivity of the antenna according to the degree of interference that was found.

The wireless communication control method according to the present invention is a method of controlling wireless communication realized by a wireless station apparatus that includes an antenna for which the direction of directivity can be adjusted and includes: a communication step of receiving signals by way of the antenna, a detection step of detecting the direction of arrival of the signals that were received, a determination step of determining whether the transmission origin of the signals that were received is a permitted wireless station apparatus for which connection is permitted or a nonpermitted wireless station apparatus for which connection is not permitted, and an adjustment step of, based on the determination results and the signals, finding the degree of interference of the permitted wireless station apparatus and the nonpermitted wireless station apparatus in the direction of arrival that was detected and adjusting the direction of directivity of the antenna according to the degree of interference that was found.

The program according to the present invention is a program for causing a computer that is connected to an antenna for which the direction of directivity can be adjusted to execute: a communication process of receiving signals by way of the antenna, a detection process of detecting the direction of arrival of the signals that are received, a determination process of determining whether the transmission origin of the signals that are received is a permitted wireless station apparatus for which connection is permitted or a nonpermitted wireless station apparatus for which connection is not permitted, and an adjustment process of, based on the determination results and the signals, finding the degree of interference of the permitted wireless station apparatuses and the nonpermitted wireless station apparatuses in the direction of arrival that was detected and adjusting the direction of directivity of the antenna according to the degree of interference that was found.

Effect of the Invention

According to the present invention, deterioration in communication quality can be suppressed.

BEST MODE FOR CARRYING OUT THE INVENTION

Exemplary embodiments of the present invention are next described with reference to the accompanying drawings. In the following explanation, components having the same functions are given the same reference numbers and explanations of these components are in some cases omitted.

First Exemplary Embodiment of the Invention

Figure 1:
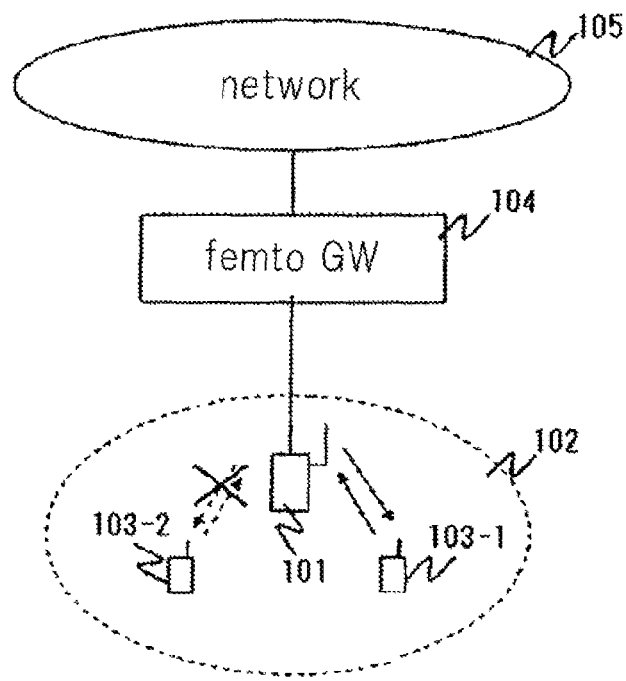
FIG. 1 is a block diagram showing a wireless communication system that includes a femto base station of the related art.
Figure 2A:
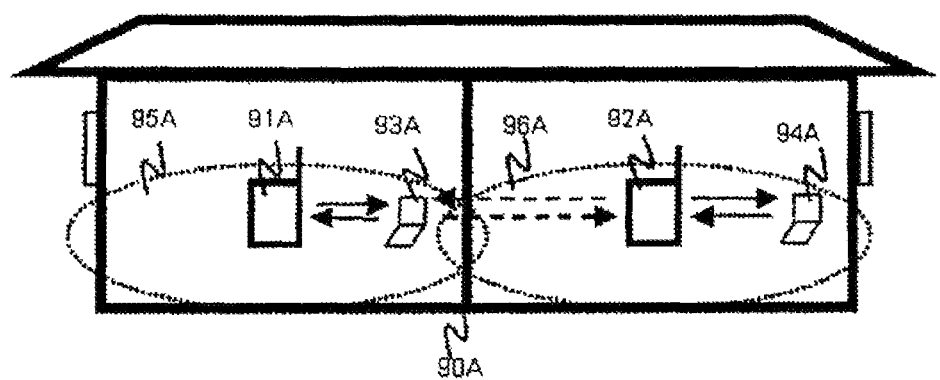
FIG. 2A is an explanatory view showing an example of the arrangement of femto base stations of the related art.
Figure 2B:
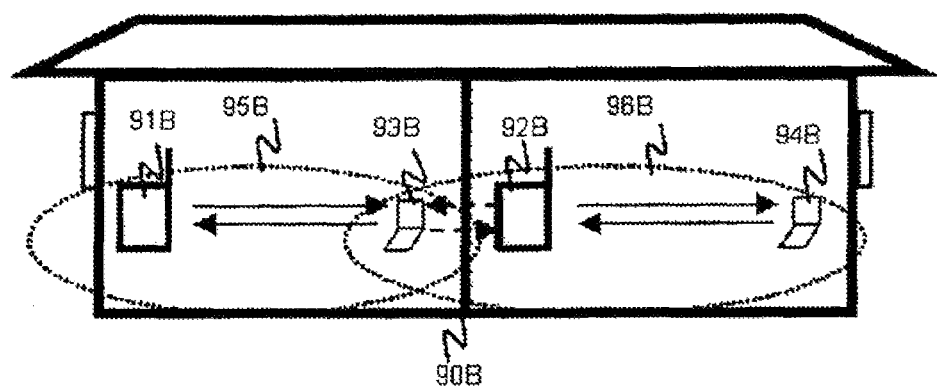
FIG. 2B is an explanatory view showing an example of the arrangement of a femto base stations of the related art.
Figure 3:
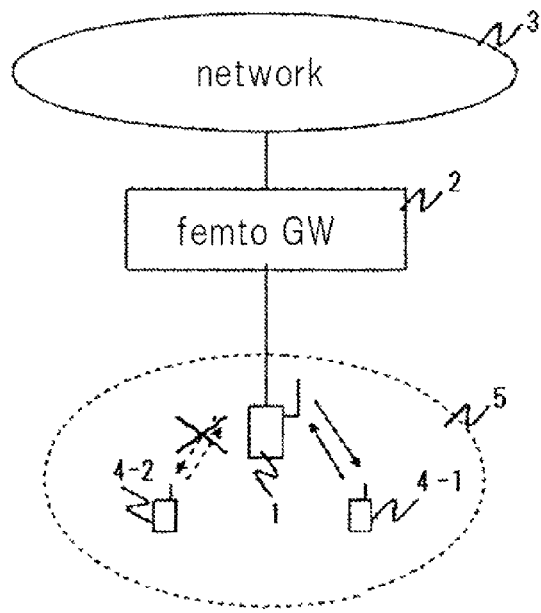
FIG. 3 is a block diagram showing the wireless communication system of the first exemplary embodiment according to the present invention.

FIG. 3 is a block diagram showing the wireless communication system of the first exemplary embodiment according to the present invention. In FIG. 3, the wireless communication system includes femto base station 1, femto GW (Gateway) 2, network 3, and mobile stations 4-1 and 4-2. The wireless communication system is assumed to be a W-CDMA wireless communication system.

Femto base station 1 forms femtocell 5 and connects with network 3 by way of femto GW 2. Mobile station 4-1 is a registered mobile station that is registered in advance in femto base station 1, and connection to femto base station 1 is permitted. Mobile station 4-2 is a nonregistered mobile station that is not registered in femto base station 1 and connection to femto base station 1 is not permitted.

Figure 4:
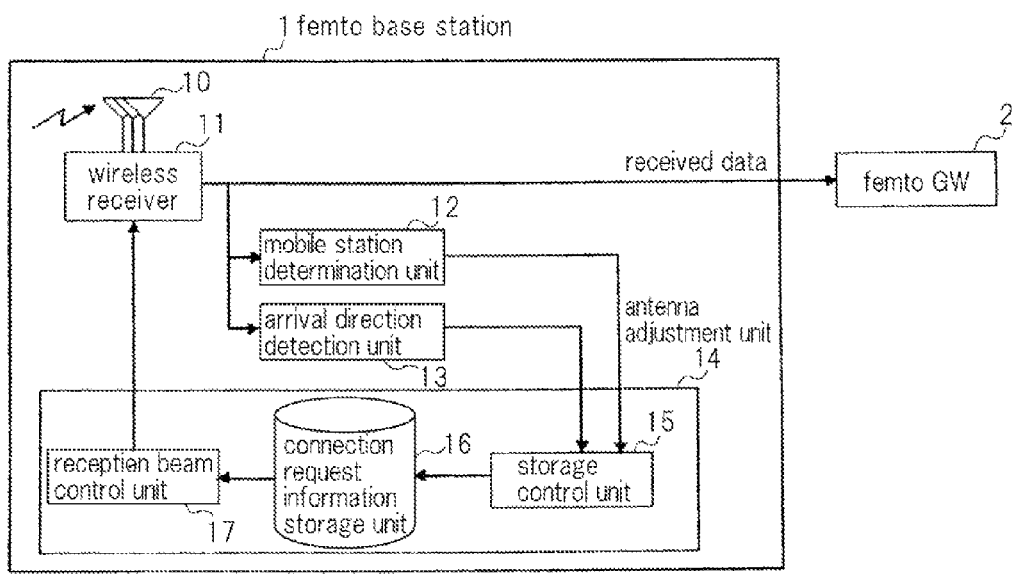
FIG. 4 is a block diagram showing an example of the configuration of femto base station 1 in the first to fourth exemplary embodiments.

FIG. 4 is a block diagram showing an example of the configuration of femto base station 1. In FIG. 4, femto base station 1 includes reception antenna 10, wireless receiver 11, mobile station determination unit 12, arrival direction detection unit 13, and antenna adjustment unit 14.

Reception antenna 10 receives uplink signals from mobile stations (registered mobile stations and nonregistered mobile stations) and transfers the uplink signals to wireless receiver 11. Uplink signals include, for example, transmission data that are transmitted to communication apparatuses (not shown) on network 3 and connection request signals for requesting connection to femto base station 1. A connection request signal contains a mobile station ID that is identification information that specifies the transmission-origin mobile station of the connection request signal.

In reception antenna 10, the direction of directivity can be adjusted by adjusting the direction of the main beam. For example, in reception antenna 10, a plurality of antenna elements are aligned separated by a predetermined spacing, and the direction of the main beam is adjusted by adjusting the antenna gain of each antenna element.

Wireless receiver 11 is one example of the communication means. Wireless receiver 11 receives uplink signals from reception antenna 10, whereby wireless receiver 11 receives uplink signals from mobile stations by way of reception antenna 10.

Wireless receiver 11 transmits the received data of the uplink signals to femto GW 2. Wireless receiver 11 further corresponds to a receiver of various modes such as W-CDMA or E-UTRA.

Mobile station determination unit 12 is one example of the determination means. Mobile station determination unit 12 determines whether the transmission-origin mobile station of a connection request signal that is received by wireless receiver 11 is a permitted mobile station that has permission to connect with the station of mobile station determination unit 12 (femto base station 1) or a nonpermitted mobile station that lacks permission to connect with the station.

In the present exemplary embodiment, when the transmission-origin mobile station is a registered mobile station that has registered in advance which the station of mobile station determination unit 12, mobile station determination unit 12 determines that this transmission-origin mobile station is a permitted mobile station, and when the transmission origin mobile station is a nonregistered mobile station that has not registered in advance with the station, mobile station determination unit 12 determines that this transmission origin mobile station is a nonpermitted mobile station.

For example, mobile station determination unit 12 first holds a permission list of mobile station IDs that specify registered mobile stations and refers to the permission list for the mobile station ID that is contained in a connection request signal. If the mobile station ID contained in the connection request signal is in the permission list, mobile station determination unit 12 then determines that the transmission-origin mobile station is a registered mobile station, and when the mobile station ID contained in the connection request signal is not in the permission list, mobile station determination unit 12 determines that the transmission origin mobile station is a nonpermitted mobile station.

A permitted mobile station is an example of a permitted wireless station apparatus, and a nonpermitted mobile station is an example of a nonpermitted wireless station apparatus. In addition, a registered mobile station is an example of a registered wireless station apparatus.

Arrival direction detection unit 13 is an example of the detection means. Based on the connection request signal that is received by wireless receiver 11, arrival direction detection unit 13 detects the direction of arrival of the connection request signal. The direction of arrival can be represented as an angle when a predetermined direction is taken as 0°.

In the detection of the direction of arrival, a method such as a beam-forming method is applied in which the direction of arrival of a signal is estimated by measuring received power according to the angle. The detection of the direction of arrival will be obvious to one of ordinary skill in the art and detailed explanation is therefore here omitted.

Antenna adjustment unit 14 is an example of the adjustment means. Based on a connection request signal received by wireless receiver 11 and the determination result of mobile station determination unit 12, antenna adjustment unit 14 finds the degree of interference of permitted mobile stations and nonpermitted mobile stations in the direction of arrival that was detected by arrival direction detection unit 13. More specifically, as the degree of interference, antenna adjustment unit 14 finds the frequency of reception of, among the signals from the direction of arrival that was detected by arrival direction detection unit 13, signals from the transmission-origin mobile stations that were determined to be nonpermitted mobile stations.

Antenna adjustment unit 14 adjusts the direction of directivity of reception antenna 10 according to the degree of interference that was found.

More specifically, antenna adjustment unit 14 includes storage control unit 15, connection request information storage unit 16, and reception beam control unit 17, and each component carries out the processing described below.

Storage control unit 15 generates a nonpermission log of signals from transmission-origin mobile stations that were determined to be nonpermitted mobile stations in mobile station determination unit 12. In the nonpermission log, the number of receptions of connection request signals from transmission-origin mobile stations that were determined not to be registered mobile stations is placed in correspondence with each direction of arrival of connection request signals.

Time information that indicates the date and time of receiving connection request signals from nonpermitted mobile stations or mobile station IDs of the nonpermitted mobile stations may also be included in the nonpermission log. In addition, storage control unit 15 may store a permission log of the signals of transmission-origin mobile stations that have been determined by mobile station determination unit 12 to be permitted mobile stations in connection request information storage unit 16. In the permission log, the number of receptions of connection request signals from transmission-origin mobile stations that were determined to be permitted mobile stations is stored in association with each direction of arrival of the connection request signals.

Reception beam control unit 17 adjusts the direction of directivity of reception antenna 10 based on the nonpermission log that is stored in connection request information storage unit 16.

For example, reception beam control unit 17 first finds, for each direction of arrival, the number of receptions corresponding to that direction of arrival in the nonpermission log as the reception frequency of connection request signals from transmission origins that have been determined to be nonpermitted mobile stations (this reception frequency is hereinbelow referred to as connection request frequency A1). Reception beam control unit 17 uses connection request frequency A1 as the degree of interference relating to permitted mobile stations.

Reception beam control unit 17 next determines, for each direction of arrival, whether connection request frequency A1 of that direction of arrival is greater than threshold value Th1 that has been determined in advance.

When there is connection request frequency A1 that is greater than threshold value Th1, reception beam control unit 17 decreases by a predetermined amount the reception gain of reception antenna 10 of the arrival direction that corresponds to connection request frequency A1 that is greater than threshold value Th1. In this way, the directivity of this arrival direction of reception antenna 10 is decreased. Threshold value Th1 is an example of the first threshold value.

Figure 5:
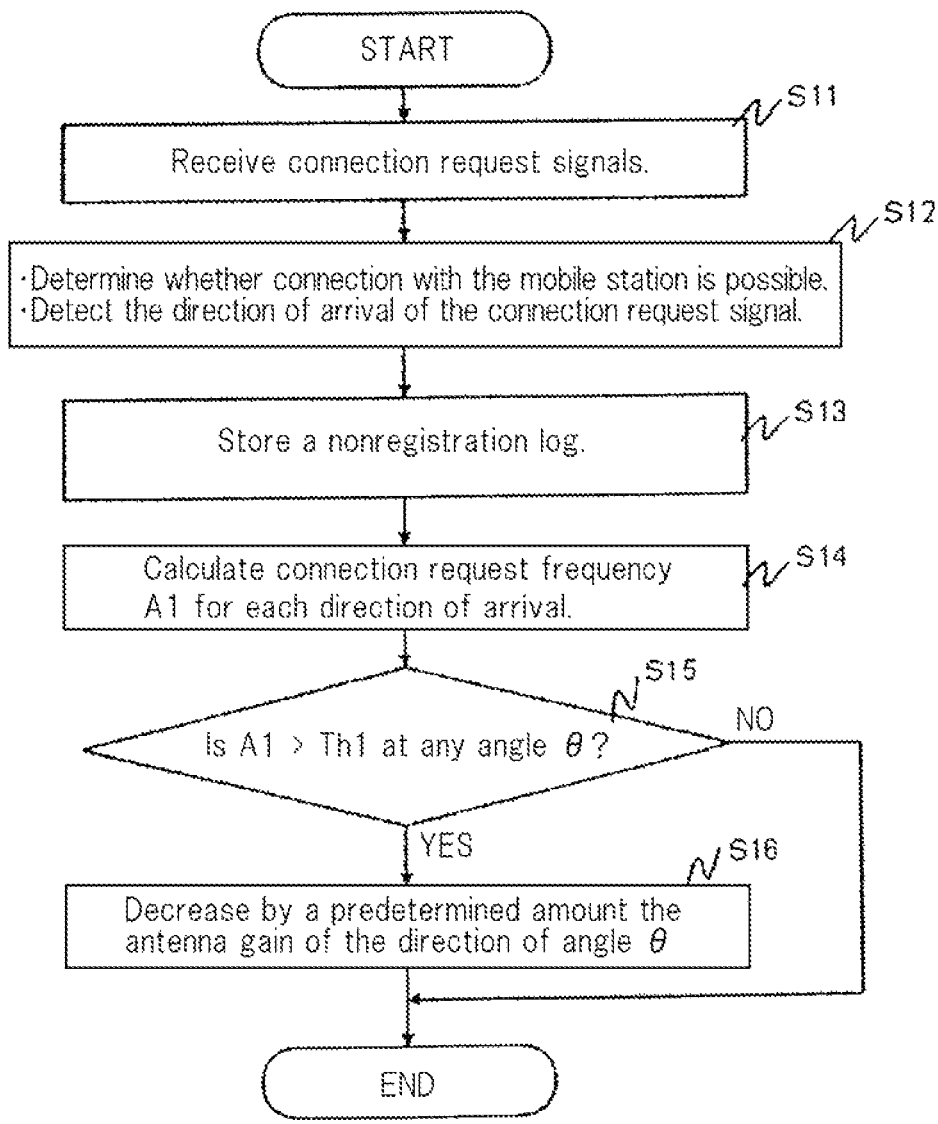
FIG. 5 is an explanatory view for describing the operations of the wireless communication system of the first exemplary embodiment.

Operations are next described. More specifically, an example of the operations of adjusting the direction of directivity of reception antenna 10 by using connection request signals from nonpermitted mobile stations is next described. FIG. 5 is a flow chart for describing this example of operations.

It is assumed that the initial state of the direction of directivity of reception antenna 10 is not determined. In other words, reception antenna 10 is assumed to be in a nondirectional (omnidirectional) state. It is further assumed that when connection has been denied, connection request signals are not transmitted by a mobile station for a predetermined halt interval. Making such settings enables the suppression of frequent transmission of connection request signals by nonpermitted mobile stations.

In Step S11, reception antenna 10 receives a connection request signal transmitted by a mobile station and transmits this connection request signal to wireless receiver 11. Wireless receiver 11, upon receiving this connection request signal, executes Step S12.

In Step S12, wireless receiver 11 transmits the connection request signal to mobile station determination unit 12 and arrival direction detection unit 13.

Mobile station determination unit 12, upon receiving the connection request signal, determines whether the mobile station ID contained in the connection request signal is on the permission list or not, and determines whether the transmission-origin mobile station of the connection request signal is a permitted mobile station or a nonpermitted mobile station. Mobile station determination unit 12 then transmits the determination results to storage control unit 15.

Upon receiving the connection request signal, arrival direction detection unit 13 detects the direction of arrival of the connection request signal based on the connection request signal. Arrival direction detection unit 13 then transmits the detection result to storage control unit 15.

Storage control unit 15, having received the determination result and detection result, executes Step S13.

In Step S13, storage control unit 15 generates the nonpermission log based on the determination result and detection result and stores the nonpermission log in connection request information storage unit 16.

For example, when the determination result indicates a nonpermitted mobile station, storage control unit 15 adds "1" to the number of receptions corresponding to the arrival direction that is the same as the arrival direction shown in the received detection result in the nonpermission log that was stored in connection request information storage unit 16. At this time, storage control unit 15 may also store the current time or the mobile station ID contained in the connection request information in association with the arrival direction.

Steps S11-13 are carried out each time reception antenna 10 receives a connection request signal. Reception beam control unit 17 further periodically executes Step S14.

In Step S14, reception beam control unit 17 calculates connection request frequency A1 as the degree of interference for each arrival direction based on the nonpermission log that was stored in connection request information storage unit 16.

For example, reception beam control unit 17 calculates the number of receptions in the nonpermission log as connection request frequency A1 of the direction of arrival that was placed in correspondence with that number of receptions.

A totalization interval in which nonpermission logs are collected may be set in advance and connection request frequency A1 for each direction of arrival may then be taken as the number of receptions within this set totalization interval. In this case, reception beam control unit 17, by initializing the number of receptions contained in the nonpermission logs to "0" for each totalization interval, takes connection request frequency A1 as the number of receptions within a totalization interval.

This totalization interval is preferably longer than the previously mentioned halt interval of connection request signals in nonpermitted mobile stations.

When the degree of interference has been calculated, reception beam control unit 17 executes Step S15.

In Step S15, reception beam control unit 17 determines for each direction of arrival whether connection request frequency A1 of the arrival direction is greater than threshold value Th1 that was determined in advance. When connection request frequency A1 occurs that is greater than threshold value Th1, reception beam control unit 17 executes Step S16, and when there is no connection request frequency A1 that is greater than threshold value Th1, reception beam control unit 17 ends the process.

In Step S16, reception beam control unit 17 transmits to wireless receiver 11 a decrease instruction indicating a decrease of a predetermined amount in the reception gain of reception antenna 10 relative to the nondirectional state for the direction of arrival (assumed to be angle θ) of connection request frequency A1 that is greater than the threshold value Th1. Upon receiving the decrease instruction, wireless receiver 11 decreases by a predetermined amount with respect to the time of non-directivity the reception gain of reception antenna 10 for the arrival direction (assumed to be angle θ) indicated by the decrease instruction.

When the connection request frequency of a plurality of directions of arrival are greater than threshold value Th1, reception beam control unit 17 may decrease the reception gain of reception antenna 10 for the plurality of directions of arrival, or may decrease the reception gain of reception antenna 10 for the direction of arrival for which connection request frequency A1 is a maximum.

There are various known methods of calculating the weighting factor of each antenna element from the pattern of reception gain of reception antenna 10 when reception antenna 10 has a plurality of antenna elements, and because any of these methods may be employed, an explanation of these methods is here omitted.

Reception beam control unit 17 should further execute the above-described operations (Step S14-Step S16) cyclically for each totalization interval. In addition, when connection request frequency A1 of nonpermitted mobile stations in a direction of arrival in which the reception gain was decreased is equal to or less than threshold value Th1 following adjustment of the reception gain of reception antenna 10, reception beam control unit 17 may gradually increase the reception gain in this direction of arrival. However, the margin of increase is made less than or equal to the margin of decrease, and the reception gain after increase is not allowed to exceed the reception gain before decrease.

This reception gain adjustment procedure is merely an example. For example, when the antenna gain is to be decreased, reception beam control unit 17 may also perform adjustment by comparing connection request frequency A1 with multiple-stage threshold values such that the antenna gain gradually becomes smaller with an increase in the connection request frequency by nonpermitted mobile stations.

The effect is next described.

According to the present exemplary embodiment, arrival direction detection unit 13 detects the direction of arrival of uplink signals that are received by wireless receiver 11. Mobile station determination unit 12 determines whether the transmission-origin mobile stations of the uplink signals that are received by wireless receiver 11 are permitted mobile station or nonpermitted mobile stations. Based on the uplink signals that are received by wireless receiver 11 and the determination results of mobile station determination unit 12, antenna adjustment unit 14 finds the degree of interference of permitted mobile stations and nonpermitted mobile stations in the direction of arrival that was detected in arrival direction detection unit 13. Antenna adjustment unit 14 adjusts the direction of directivity of reception antenna 10 according to the degree of interference that was found.

In this case, it is determined whether the transmission-origin mobile stations of the uplink signals are permitted mobile stations or nonpermitted mobile stations, and based on the determination results, the degree of interference of permitted mobile stations and nonpermitted mobile stations is found in the direction of arrival of the uplink signals. The direction of directivity of reception antenna 10 is then adjusted according to this degree of interference.

As a result, the directivity of an antenna can be adjusted to suppress interference that is received by permitted mobile stations from nonpermitted mobile stations. Accordingly, deterioration in communication quality can be suppressed.

In the present exemplary embodiment, of the signals from the arrival direction detected in arrival direction detection unit 13, antenna adjustment unit 14 calculates the connection request signal reception frequency (connection request frequency A1) from transmission origin mobile stations that are determined to be nonpermitted mobile stations as the degree of interference.

The number of nonpermitted mobile stations that exist in a particular direction in a particular direction increase in line with the increase of connection request frequency A1 in that direction Accordingly, connection request frequency A1 represents the degree of interference of permitted mobile stations and nonpermitted mobile stations, and more specifically, represents the degree of interference received by permitted mobile stations from nonpermitted mobile stations. To state more specifically, connection request frequency A1 represents the degree of interference received by signals that are received by femto base station 1 from permitted mobile stations from signals transmitted by nonpermitted mobile stations to other wireless stations.

As a result, because the measurement of connection request frequency A1 is comparatively easy, the degree of interference can be easily found. The other wireless stations are, for example, other femto base stations or macro base stations that form a higher-level macro-cell.

When there is a connection request signal from a nonpermitted mobile station, that nonpermitted mobile station is highly likely to communicate with another wireless station. It is therefore possible to suppress the interference that a permitted mobile station receives from a nonpermitted mobile station while the nonpermitted mobile station is communicating with the other wireless station. In addition, because a mobile station normally transmits many signals during communication, when interference is suppressed while a nonpermitted mobile station is communicating with another wireless station, interference can be effectively suppressed.

In the present exemplary embodiment, when connection request frequency A1 is greater than threshold value Th1, antenna adjustment unit 14 adjusts the direction of directivity of reception antenna 10.

In such cases, it is possible to adjust the direction of directivity of reception antenna 10 only when the degree of interference is great. It is thus possible to effectively improve the efficiency of the suppression of interference.

In the present exemplary embodiment, moreover, when connection request frequency A1 is greater than threshold value Th1, antenna adjustment unit 14 decreases by a predetermined amount the reception gain of reception antenna 10 in the arrival direction detected in arrival direction detection unit 13 and thus adjusts the directivity of reception antenna 10 for that direction of arrival.

In this case, interference received by permitted mobile stations from nonpermitted mobile stations can be effectively suppressed. In addition, the directivity of reception antenna 10 can be adjusted without providing a mechanical construction such as a rotation mechanism that mechanically rotates reception antenna 10 that has directivity.

Second Exemplary Embodiment of the Invention

Although nonpermitted mobile stations are presumed to transmit connection request signals in the first exemplary embodiment, there are also wireless communication systems that are configured such that nonpermitted mobile stations are not allowed to transmit connection request signals. The present exemplary embodiment has the aim of suppressing interference in this type of wireless system.

Femto base station 1 of the present exemplary embodiment adjusts the direction of directivity of reception antenna 10 according to the connection request frequency as in the first exemplary embodiment. However, the present exemplary embodiment differs from the first exemplary embodiment in that the reception frequency of connection request signals from permitted mobile stations rather than from nonpermitted mobile stations is used as the connection request frequency. In addition, the configuration of femto base station 1 of the present exemplary embodiment is the same as the configuration shown in FIG. 4.

In the present exemplary embodiment, storage control unit 15 stores permission logs in connection request information storage unit 16.

Reception beam control unit 17 adjusts the direction of directivity of reception antenna 10 based on the permission logs that are stored in connection request information storage unit 16.

For example, reception beam control unit 17 first finds, for each arrival direction, the number of receptions corresponding to the arrival direction in the permission log as the reception frequency of connection request signals from transmission origins that are determined to be permitted mobile stations (hereinbelow, referred to as connection request frequency B1). Reception beam control unit 17 uses connection request frequency B1 as the degree of interference that relates to permitted mobile stations.

Reception beam control unit 17 next determines, for each direction of arrival, whether connection request frequency B1 for that direction of arrival is greater than threshold value Th2 that was determined in advance.

When there is connection request frequency B1 that is smaller than threshold value Th2, reception beam control unit 17 decreases by a predetermined amount the reception gain of reception antenna 10 for the direction of arrival that corresponds to connection request frequency B1 that is smaller than threshold value Th2. In this way, directivity in this arrival direction is decreased. Threshold value Th2 is an example of the second threshold value.

The method of calculating connection request frequency B1 is the same as the method of calculating connection request frequency A1 in the first exemplary embodiment. In addition, the method of adjusting the direction of directivity of the antenna is also the same as in the first exemplary embodiment.

The effect is next described.

According to the present exemplary embodiment, antenna adjustment unit 14 calculates as the degree of interference the reception frequency (connection request frequency B1) of, among the signals from the arrival direction that was detected in arrival direction detection unit 13, connection request signals from transmission origin mobile stations that have been determined to be permitted mobile stations.

Connection request signals, if for permitted mobile stations, are transmitted when necessary, and the degree of interference can therefore be found even when nonpermitted mobile stations are not transmitting connection request signals. Accordingly, interference received by permitted mobile stations from nonpermitted mobile stations can be suppressed even when nonpermitted mobile stations do not transmit connection request signals.

In the present exemplary embodiment, the nonexistence of permitted mobile stations in a particular direction is viewed as the absence of need to receive radio waves from that direction or as the possibility that nonpermitted mobile stations are present in that direction. For example, when femto base station 1 is being used in a particular room and that femto base station is disposed close to the wall, there is little possibility that a permitted mobile station is in the direction of the wall and connection request frequency B1 therefore decreases small. On the other hand, the possibility that nonpermitted mobile stations are in the neighboring room separated by the wall is high.

In the present exemplary embodiment, antenna adjustment unit 14 adjusts the direction of directivity of reception antenna 10 when connection request frequency B1 is smaller than threshold value Th2.

In this case, as connection request frequency B1 of a particular direction decreases, the number of nonpermitted mobile stations present in that direction increases. For example, femto base station 1 is believed to approach the wall as connection request frequency B1 of a particular direction decreases. As a result, the femtocell range of femto base station 1 that extends to the neighboring room on the other side of the wall is increased and the number of nonpermitted mobile stations present in that direction consequently also increases. Connection request frequency B1 is therefore comparatively easy to measure, and the degree of interference can be easily found.

Third Exemplary Embodiment of the Invention

The connection request frequency of only permitted mobile stations or of nonpermitted mobile stations has been used as the degree of interference, the connection request frequency of nonpermitted mobile stations being used in the first exemplary embodiment and the connection request frequency of permitted mobile stations being used in the second exemplary embodiment. Femto base station 1 of the present exemplary embodiment uses the connection request frequency of both nonpermitted mobile stations and permitted mobile stations as the degree of interference.

In the present exemplary embodiment, reception beam control unit 17 uses connection request frequency A1 and connection request frequency B1 as the degree of interference relating to permitted mobile stations.

Reception beam control unit 17 determines, for each direction of arrival, whether connection request frequency A1 of that direction of arrival is greater than predetermined threshold value Th3 or not and whether connection request frequency B1 of that direction of arrival is greater than predetermined threshold value Th4 or not.

When connection request frequency A1 due to nonpermitted mobile stations is greater than threshold value Th3 and when connection request frequency B1 due to permitted mobile stations is smaller than predetermined threshold value Th4, reception beam control unit 17 adjusts the direction of directivity of reception antenna 10 by decreasing by a predetermined amount the reception gain of reception antenna 10 for the direction that corresponds to connection request frequency A1 or B1.

Threshold value Th3 is an example of the first threshold value, and threshold value Th4 is an example of the second threshold value. Threshold value Th3 may be the same value as threshold value Th1, or may be a different value. Threshold value Th4 may further be the same value as threshold value Th2, or may be a different value.

According to the present exemplary embodiment, interference received by permitted mobile stations from nonpermitted mobile stations can be suppressed regardless of whether the wireless communication system is a wireless communication system that prevents nonpermitted mobile stations from transmitting connection request signals.

Fourth Exemplary Embodiment of the Invention

In the first to third exemplary embodiments, connection request frequency was used as the degree of interference. In the present exemplary embodiment, the reception power of uplink signals is used as the direction of interference. The uplink signals may be connection request signals or may be signals other than connection request signals.

In the present exemplary embodiment, storage control unit 15 measures the reception power of uplink signals that are received by wireless receiver 11. When mobile station determination unit 12 determines that the transmission-origin mobile station of uplink signals is a nonpermitted mobile station, storage control unit 15 generates a nonpermission log in which the measured reception power is placed in association with the direction of arrival that was determined by arrival direction detection unit 13 and stores the generated nonpermission log in connection request information storage unit 16.

On the other hand, when mobile station determination unit 12 determines that the transmission-origin mobile station of the uplink signals is a permitted mobile station, storage control unit 15 generates a permission log in which the measured received power is placed in association with the direction of arrival that was detected by arrival direction detection unit 13 and stores the generated permission log in connection request information storage unit 16.

Reception beam control unit 17 calculates, for each direction of arrival, the reception power in the nonpermission log or the reception power in the permission log or both the reception power in the nonpermission log and the reception power in the permission log that corresponds to the direction of arrival as the degree of interference. In the following description, both the reception power in the nonpermission log and the reception power in the permission log are calculated as the degree of interference.

Where there is a plurality of reception powers that correspond to an arrival direction, reception beam control unit 17 may use as the degree of interference: all of the reception powers, the most recent reception power, the largest reception power, or the average value of the reception powers.

Reception beam control unit 17 determines, for each arrival direction, whether the reception power in the nonpermission log of that arrival direction is greater than a predetermined threshold value Th5 and whether the reception power in the permission log of that arrival direction is greater than a predetermined threshold value Th6. When there is a reception power in the nonpermission log that is greater than threshold value Th5, and further, there is a reception power in the permission log that is smaller than threshold value Th6, reception beam control unit 17 decreases by a predetermined amount the reception gain of reception antenna 10 for the arrival direction that corresponds to that reception power. Threshold value Th5 is an example of the first threshold value, and threshold value Th6 is an example of the second threshold value.

The effect is next described.

According to the present exemplary embodiment, antenna adjustment unit 14 calculates as the degree of interference at least one of the reception power of signals from transmission origins that are determined to be permitted mobile stations and the reception power of signals from transmission origins that are determined to not be permitted mobile stations.

The interference received by permitted mobile stations from transmission-origin mobile stations that are determined to be nonpermitted mobile stations in a particular direction increases in proportion to the strength of the reception power of the signal from the nonpermitted mobile stations. In addition, the interference that is received by permitted mobile stations from the nonpermitted mobile stations is believed to increase in reverse proportion to the reception power of the signals from transmission-origin mobile stations that are determined to be permitted mobile stations in a particular direction, similar to a case in which connection request frequency B1 is small. Accordingly, the magnitude of these reception powers indicates the degree of interference received by permitted mobile stations from nonpermitted mobile stations. Because the measurement of reception power is comparatively easy, the degree of interference can be easily calculated.

Fifth Exemplary Embodiment of the Invention

In the first to fourth exemplary embodiments, cases were described in which the direction of directivity of reception antenna 10 for receiving information was adjusted, but in the present exemplary embodiment, the direction of directivity of a transmission antenna for transmitting information is adjusted.

Figure 6:
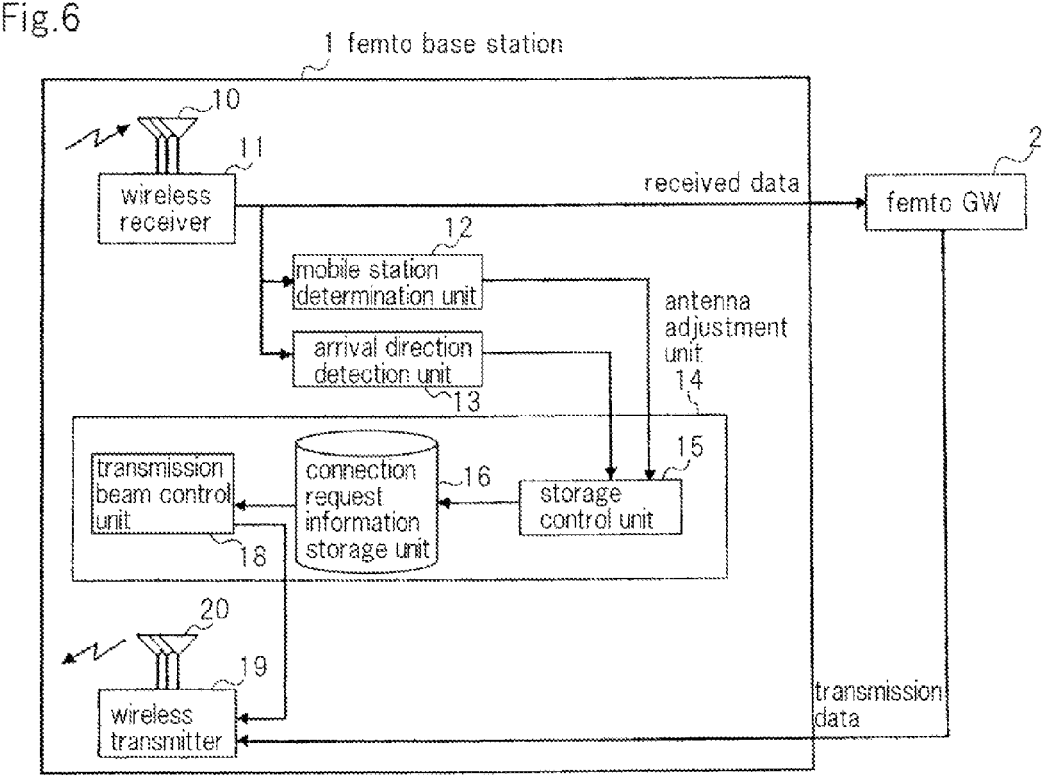
FIG. 6 is a block diagram showing an example of the configuration of femto base station 1 in the fifth exemplary embodiment.

FIG. 6 is a block diagram showing the configuration of femto base station 1 of the present exemplary embodiment. In FIG. 6, the points of difference with respect to FIG. 4 are the replacement of reception beam control unit 17 of antenna adjustment unit 14 by transmission beam control unit 18 and the addition of wireless transmitter 19 and transmission antenna 20. The constituent elements are otherwise identical to FIG. 4 and redundant explanation is therefore here omitted.

Transmission beam control unit 18 adjusts the direction of directivity of transmission antenna 20 based on nonpermission logs that are stored in connection request information storage unit 16.

More specifically, similar to reception beam control unit 17, transmission beam control unit 18 finds, for each direction of arrival, the number of receptions for that direction of arrival in nonpermission logs as the reception frequency (connection request frequency A1) of connection request signals from transmission origins that are determined not to be permitted mobile stations. Transmission beam control unit 18 uses connection request frequency A1 as the degree of interference relating to permitted mobile stations.

Transmission beam control unit 18 next determines for each direction of arrival whether connection request frequency A1 of that direction of arrival is greater than threshold value Th5 that has been determined in advance. Threshold value Th5 is an example of the first threshold value and may be the same value as threshold value Th1 or may be a value different from threshold value Th1.

When there is a connection request frequency A1 that is greater than threshold value Th5, reception beam control unit 17 decreases by a predetermined amount the reception gain of reception antenna 10 of the direction of arrival that corresponds to connection request frequency A1 that is greater than threshold value Th5.

Similar to reception beam control unit 17, transmission beam control unit 18 may set in advance a totalization interval for collecting nonpermission logs and may use the nonpermission logs within the totalization interval that has been set. This totalization interval is preferably longer than the halt interval of connection request signals in nonregistered mobile stations, similar to reception beam control unit 17.

Wireless receiver 11 and wireless transmitter 19 are included in the communication means. Wireless transmitter 19 transmits transmission data that have been transferred in from femto GW 2 to mobile stations by way of transmission antenna 20. Wireless transmitter 19 corresponds to transmitters of various modes such as W-CDMA and E-UTRA.

Transmission antenna 20 transmits transmission data from wireless transmitter 19 to mobile stations.

Transmission antenna 20 further, is capable of adjusting the direction of directivity by adjustment of the direction of its main beam. For example, similar to reception antenna 10, a plurality of antenna elements are aligned separated by a predetermined spacing, whereby the direction of the main beam is adjusted by adjusting the antenna gain of each antenna element.

In the present exemplary embodiment, the operations of adjusting the transmission gain of transmission antenna 20 are similar to the flow chart of FIG. 5 in the first exemplary embodiment. However, the operations of Steps S14, S15, and S16 that are implemented by reception beam control unit 17 in the first exemplary embodiment are implemented by transmission beam control unit 18 in the present exemplary embodiment. When constituted by arranging a plurality of antenna elements as transmission antenna 20, there are various already known methods of calculating the weighting factor of each antenna element based on the pattern of transmission gain of the antenna, and because any of these methods can be used, further explanation is here omitted.

The effect is next described.

According to the present exemplary embodiment, antenna adjustment unit 14 adjusts the direction of directivity of transmission antenna 20 based on the reception frequency of connection request signals (connection request frequency A1) due to nonregistered mobile stations for each direction of arrival.

The number of nonpermitted mobile stations present in a particular direction increases with the increase of connection request frequency A1 in that direction. Accordingly, connection request frequency A1 represents the degree of interference by permitted mobile stations with nonpermitted mobile stations, and more specifically, represents the degree of interference given by permitted mobile stations to nonpermitted mobile stations. More specifically, connection request frequency A1 represents the degree of interference given by signals transmitted by femto base station 1 to permitted mobile stations to signals received by nonpermitted mobile stations from other wireless stations.

Thus, because the measurement of connection request frequency A1 is relatively easy, the degree of interference can be easily found.

Where there are connection request signals from nonpermitted mobile stations, there is a high possibility that these nonpermitted mobile stations are carrying out communication with other wireless stations. Thus, while nonpermitted mobile stations are communicating with other wireless stations, it is possible to suppress the interference given by permitted mobile stations to these nonpermitted mobile stations. In addition, because mobile stations normally transmit many signals during communication, when the interference is suppressed when nonpermitted mobile stations are communicating with other wireless stations, interference can be efficiently suppressed.

Transmission beam control unit 18, in addition to using connection request frequency A1 as described hereinabove, may also use connection request frequency B1 as in the second exemplary embodiment or may use both connection request frequency A1 and connection request frequency B1 as in the third exemplary embodiment as the degree of interference. Transmission beam control unit 18 may further use, as the degree of interference, the reception power of uplink signals from registered mobile stations or the reception power of uplink signals from nonregistered mobile stations, or both the reception power of uplink signals from registered mobile stations and the reception power of uplink signals from nonregistered mobile stations, as in the fourth exemplary embodiment.

Sixth Exemplary Embodiment of the Invention

The direction of directivity of reception antenna 10 is adjusted in the first to fourth exemplary embodiments, and the direction of directivity of transmission antenna 20 is adjusted in the fifth exemplary embodiment. In the present exemplary embodiment, the directions of directivity of each of reception antenna 10 and transmission antenna 20 are adjusted.

Figure 7:
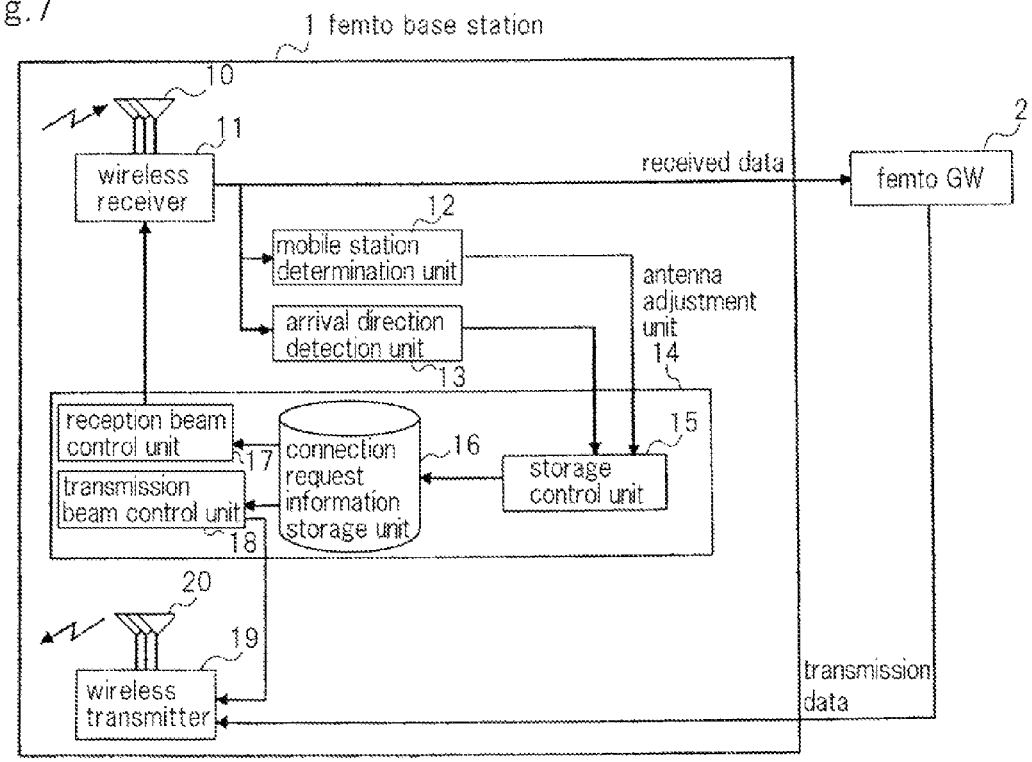
FIG. 7 is a block diagram showing an example of the configuration of femto base station 1 in the sixth exemplary embodiment.

FIG. 7 is a block diagram showing the configuration of femto base station 1 of the present exemplary embodiment. In FIG. 7, the points of difference with respect to FIG. 4 are the addition of transmission beam control unit 18 to antenna adjustment unit 14 and the addition of wireless transmitter 19 and transmission antenna 20. The constituent elements are otherwise identical to FIG. 4, and redundant explanation is therefore omitted. In addition, the functions and operations of transmission beam control unit 18, wireless transmitter 19, and transmission antenna 20 are identical to the functions and operations described in the fifth exemplary embodiment, and redundant explanation is therefore here omitted.

Wireless receiver 11 and wireless transmitter 19 make up the communication unit, and the communication unit carries out communication with transmission-origin mobile stations that are determined to be permitted mobile stations in mobile station determination unit 12.

The effect is next described.

In the present exemplary embodiment, the interference given by permitted mobile stations to nonpermitted mobile stations and the interference received by permitted mobile stations from nonpermitted mobile stations can both be suppressed.

Seventh Exemplary Embodiment of the Invention

The configurations of femto base station 1 shown in FIG. 4, FIG. 6, and FIG. 7 are merely examples. The configuration of femto base station 1 is not limited to these configurations and can be modified as appropriate.

For example, connection request information storage unit 16 may be a memory device such as a memory card that can be inserted into or removed from femto base station 1. Alternatively, connection request information storage unit 16 may be incorporated in an external memory device that can be accessed by femto base station 1, or may be incorporated in a memory device that is arranged on network 3.

A higher-order device (such as an RNC (Radio Network Controller)) on network 3 may possess the functions carried out by mobile station determination unit 12, arrival direction detection unit 13, storage control unit 15, and connection request information storage unit 16.

In such a case, reception beam control unit 17 and transmission beam control unit 18 may receive instructions to adjust the direction of directivity of the antenna (reception antenna 10 and transmission antenna 20) from the higher-order device and then adjust the direction of directivity of the antenna in accordance with the adjustment instructions. In this way, the load of such processes as the determination of whether a transmission-origin mobile station is a permitted mobile station, the holding of permission logs and nonpermission logs, and the determination of whether the direction of directivity of an antenna is to be adjusted can be freely distributed between femto base station 1 and higher-order devices on network 3.

Eighth Exemplary Embodiment of the Invention

A wireless communication system in which settings are implemented to prevent nonpermitted mobile stations from transmitting connection request signals is described in the present exemplary embodiment. The configuration of femto base station 1 of the present exemplary embodiment is the same as femto base station 1 shown in FIG. 7.

In the present exemplary embodiment, when it is determined in mobile station determination unit 12 that a transmission-origin mobile station is not a nonpermitted mobile station, wireless transmitter 19 transmits a suppression instruction for suppressing the transmission of connection request signals by way of transmission antenna 20.

In addition, reception beam control unit 17 initializes the number of receptions in nonpermission logs and permission logs for each totalization interval to calculate connection request frequency A1 as the number of receptions of connection request signals received by wireless receiver 11 within a totalization interval.

Figure 8:
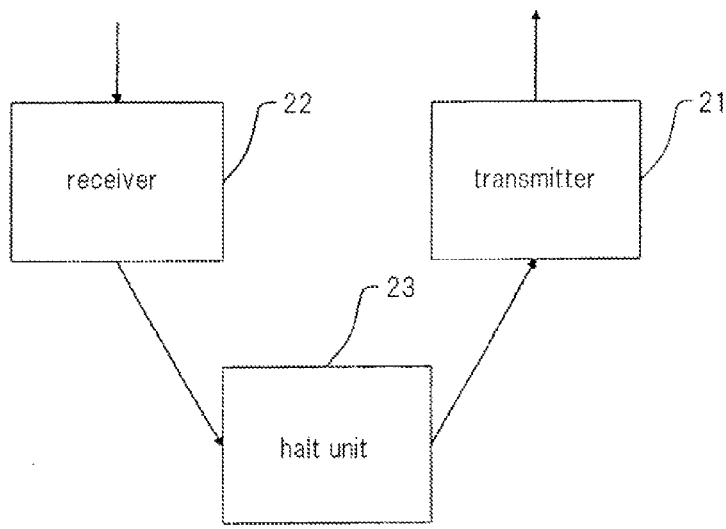
FIG. 8 is a block diagram showing an example of the configuration of a mobile station.

FIG. 8 is a block diagram showing an example of the configuration of a mobile station. In FIG. 8, the mobile station includes transmitter 21, receiver 22, and halt unit 23.

Transmitter 21 transmits connection request signals at predetermined timings. Predetermined timings include, for example, the time of call origination, the time of introducing power to a mobile station, and the time that a mobile station changes cells that are in range.

Receiver 22 receives a suppression instruction from femto base station 1.

Halt unit 23, upon reception of the suppression instruction by receiver 22, halts the transmission of connection request signals by transmitter 21 for only a predetermined halt interval. The halt interval is shorter than the above-described totalization interval.

Operations are next described. More specifically, operations are described from the determination that the transmission origin mobile station is not a registered mobile station until the transmission of connection request signals is halted.

Mobile station determination unit 12 of femto base station 1 first, upon determining that the transmission-origin mobile station is not a registered mobile station, generates a suppression instruction to suppress the transmission of connection request signals and then transmits this suppression instruction to wireless transmitter 19. Upon receiving the suppression instruction, wireless transmitter 19 transmits the suppression instruction to the transmission-origin mobile station by way of transmission antenna 20.

Next, upon receiving the suppression instruction, receiver 22 of the transmission-origin mobile station transmits the suppression instruction to halt unit 23. Halt unit 23, having received the suppression instruction, sets the predetermined halt interval in transmitter 21. When a halt interval has been set, transmitter 21 measures time and halts the transmission of connection request signals until the time exceeds the halt interval.

The effect is next described.

According to the present exemplary embodiment, when it is determined in mobile station determination unit 12 that the transmission-origin mobile station is not a registered mobile station, wireless transmitter 19 transmits a suppression instruction to suppress the transmission of connection request signals. When receiver 22 of the mobile station receives the suppression instruction, halt unit 23 halts the transmission of connection request signals by transmitter 21 for only a predetermined halt interval. Reception beam control unit 17 calculates the number of receptions of connection request signals that are received by wireless receiver 11 within a totalization interval as connection request frequency A1.

In this case, the number of receptions of connection request signals that are received within a totalization interval that is longer than a halt interval in which the transmission of connection request signals is halted is calculated as connection request frequency A1. As a result, despite the presence of a nonregistered mobile station, the degree of interference relating to a registered mobile station is calculated without connection request signals being transmitted and inaccuracy of the degree of interference can be suppressed.

Other Exemplary Embodiments

In the first to seventh exemplary embodiments, mobile station determination unit 12 determined whether a transmission-origin mobile station is a permitted mobile station or a nonpermitted mobile station by determining whether the transmission-origin mobile station of a connection request signal is a registered mobile station or not. However, mobile station determination unit 12 may even determine a nonregistered mobile station to be a permitted mobile station.

For example, mobile station determination unit 12 counts the number of mobile stations that are currently connected to its own station and determines whether this number is greater than a maximum number that has been determined in advance. When the number is not greater than the maximum number, mobile station determination unit 12 determines that the transmission-origin mobile station of a connection request signal is a permitted mobile station, and when the number is greater than the maximum number, determines that the transmission-origin mobile station of the connection request signal is a nonpermitted mobile station.

Alternatively, when the number is not greater than the maximum number, mobile station determination unit 12 may determine that the transmission-origin mobile station is a permitted mobile station when the transmission origin mobile station is a registered mobile station, and may determine that the transmission-origin mobile station is a nonpermitted mobile station when the transmission-origin mobile station is a nonregistered mobile station.

In addition, when the transmission-origin mobile station of a connection request signal is a registered mobile station, mobile station determination unit 12 may determine whether the number of mobile stations that are currently connected is greater than a maximum number or not. At this time, when the transmission-origin mobile station of a connection request signal is a nonregistered mobile station, mobile station determination unit 12 may determine whether the number of mobile stations that are currently connected is greater than a predetermined number that is less than the maximum number. In this case, mobile station determination unit 12 determines that the transmission-origin mobile station is a permitted mobile station when the number is not greater than the predetermined number and determines that the transmission-origin mobile station is a nonpermitted mobile station when the number is greater than the predetermined number.

Alternatively, mobile station determination unit 12 may compare the communication of nonpermitted mobile stations with the communication of permitted mobile station and limit the communication. More specifically, upon determining that a transmission-origin mobile station is a nonpermitted mobile station, mobile station determination unit 12 both causes the communication unit that contains wireless receiver 11 and wireless transmitter 19 to carry out communication with the transmission origin mobile station and limit the communication with the transmission origin mobile station. When the counted number is greater than the maximum number and the transmission-origin mobile station is a nonregistered mobile station, mobile station determination unit 12 may limit communication of the nonregistered mobile station. In addition, mobile station determination unit 12 may determine a nonregistered mobile station for which communication is not limited to be a permitted mobile station.

As an example of this limitation of communication, the communication speed of a nonpermitted mobile station is set slower than a permitted mobile station.

In the first to eighth exemplary embodiments, explanation employed a W-CDMA mode wireless communication system as the wireless communication system. However, the wireless communication mode of the wireless communication system is not limited to the W-CDMA mode and can be modified as appropriate. For example, the wireless communication mode of the wireless communication system may be an E-UTRA mode, WiMAX, or a TDD (Time Division Duplex) mode that uses the same wavelength frequency divided by time for uplink circuits and downlink circuits.

Although explanation used femto base station 1 as the wireless station apparatus in the first to eighth exemplary embodiments, each of a plurality of wireless stations that autonomously form a wireless ad hoc network may actually be used as the wireless station apparatuses.

Working Examples

The present working example is a working example according to the sixth exemplary embodiment. More specifically, the present working example is a concrete example of carrying out adjustment of the direction of directivity of reception antenna 10 and transmission antenna 20 based on the connection request frequency of nonregistered mobile stations for each direction of arrival.

Connection request signals that are transmitted from mobile stations include call origination from mobile stations, location registration requests transmitted from mobile stations that accompany cell selection operations at the time of the introduction of power of a mobile station, and location registration requests transmitted from mobile stations that accompany cell reselection operations at the time a mobile station changes cells that are in range.

Figure 9:
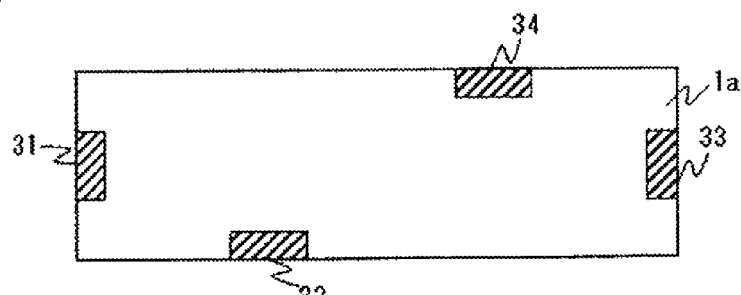
FIG. 9 is an explanatory view showing an example of the configuration of a reception antenna.

FIG. 9 is an explanatory view showing an example of the configuration of reception antenna 10.

In FIG. 9, reception antenna 10 has four antenna elements 31-34. Each of antenna elements 31-34 is incorporated in a respective side surface of case 1a of femto base station 1 separated at a predetermined spacing. Transmission antenna 20 is similar to FIG. 9.

Figure 10A:
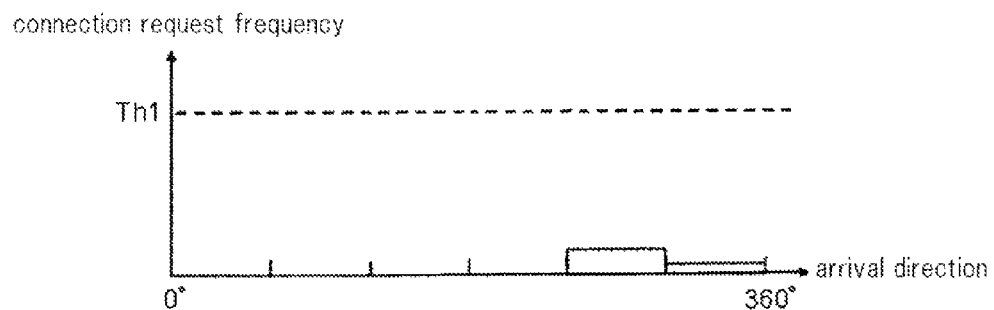
FIG. 10A is a graph showing an example of the frequency of connection requests.
Figure 10B:
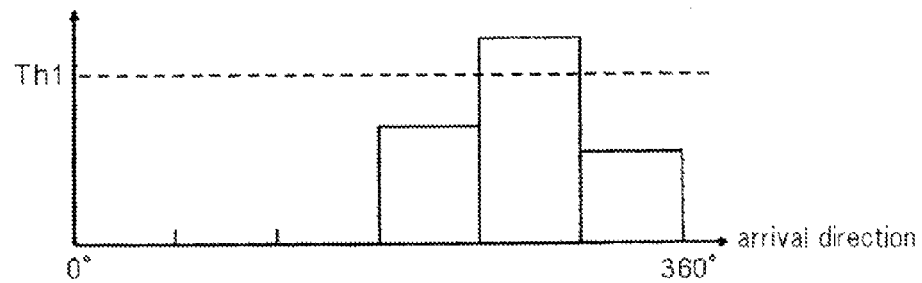
FIG. 10B is a graph showing another example of the frequency of connection requests.

FIGS. 10A and 10B are graphs showing examples of connection request frequency according to a direction of arrival at a particular time. The horizontal axes of the graphs show the directions of arrival divided into 60°-sectors from 0° to 360°. Femto base station 1 calculates the connection request frequency for each of these sectors. The vertical axes of the graphs show connection request frequency A1 due to nonregistered mobile stations. Threshold value Th1 is also shown in FIG. 10.

Figure 11A:
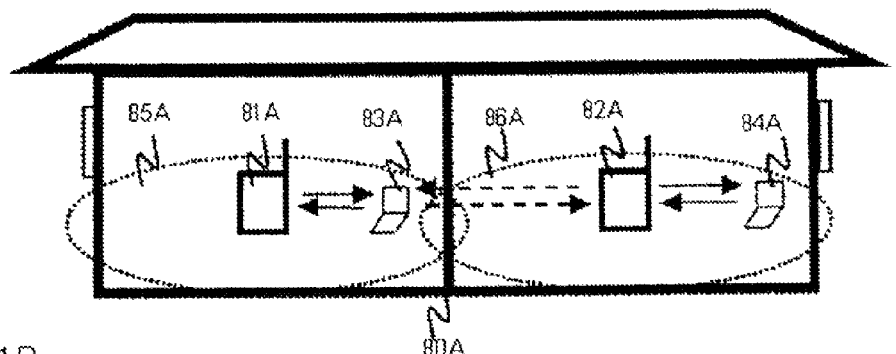
FIG. 11A is an explanatory view showing an example of the arrangement of a femto base stations and a mobile units.
Figure 11B:
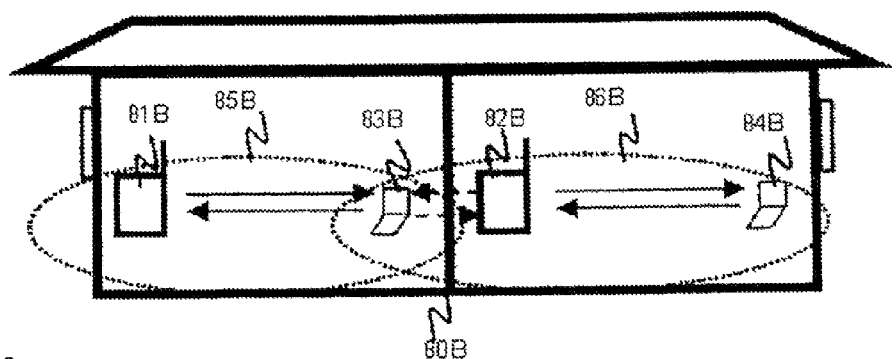
FIG. 11B is an explanatory view showing another example of the arrangement of femto base stations and mobile units.

FIGS. 11A and 11B are explanatory views showing examples of the disposition of femto base station 1 and mobile units. The graph shown in FIG. 10A corresponds to the example of the arrangement shown in FIG. 11A, and the graph shown in FIG. 10B corresponds to the example of the arrangement shown in FIG. 11B.

In FIG. 11A, femto base stations 81A and 82A are arranged in two rooms partitioned by wall 80A in the same building. Femto base stations 81A and 82A are each arranged close to the room centers of their respective rooms. In addition, femto base station 81A forms femtocell 85A, and femto base station 82A forms femtocell 86A.

Mobile station 83A is assumed to be registered in femto base station 81A but not registered in femto base station 82A. Mobile station 84A is assumed to be not registered in femto base station 81A but registered in femto base station 82A.

In this case, femto base station 82A is arranged in the center of its room and radio waves transmitted by femto base station 82A therefore suffer sufficient propagation loss for mobile station 83A to barely receive common pilot signal from femto base station 82A. Accordingly, femto base station 82A hardly receives connection request signals from mobile station 83A. As a result, connection request frequency A1 is low, as shown in FIG. 10A. At this time, the antenna gain of femto base station 82A remains unchanged in a nondirectional state.

In FIG. 11B, femto base stations 81B and 82B are arranged in two respective rooms that are partitioned by wall 80B in the same building. Femto base stations 81B and 82B are arranged close to walls in each of their respective rooms. In addition, femto base station 81B forms femtocell 85B, and femto base station 82B forms femtocell 86B.

Mobile station 83B is assumed to be registered in femto base station 81B but not registered in femto base station 82B. On the other hand, mobile station 84B is assumed to be not registered in femto base station 81B but registered in femto base station 82B.

In this case, femto base station 82B is arranged close to the wall of the room and the propagation loss of radio waves transmitted by femto base station 82B is therefore small for mobile station 83B. As a result, mobile station 83B receives the common pilot signals from femto base station 82B more strongly than the common pilot signals from femto base station 81B. Accordingly, the transmission of connection request signals to femto base station 82B increase. As a result, connection request frequency A1 becomes greater than threshold value Th1 at a particular angle, as shown in FIG. 10B. In FIG. 10B, the connection request frequency from behind femto base station 82B (angles 180°-360°) is high and surpasses threshold value Th1 in the sector of angles 240°-300°. At this time, the antenna gain of femto base station 82B is adjusted to decrease for non-directivity in the sector of angles 240°-300°. The calculation of angle θ at which the antenna gain decreases may take the median (270° in this example) of the angle sector in which the threshold value is surpassed or the average value of the arrival direction of connection request signals by nonregistered mobile stations within this angle sector. The amount of decrease of the antenna gain may be, for example, 1 dB.

Figure 12:
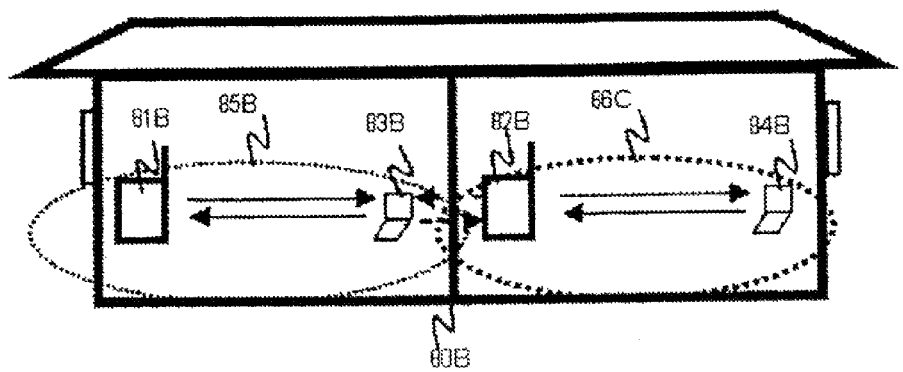
FIG. 12 shows an example of femtocells.

FIG. 12 shows femtocell 86C in which the coverage range is changed by antenna gain that has been adjusted based on the measurement results of FIG. 10B.

As shown in FIG. 12, the power that leaks to the adjacent room from femto base station 82B is decreased by adjusting the transmission gain of transmission antenna 20, and the power that is received in femto base station 82B from mobile station 83B is also decreased by adjusting the reception gain of reception antenna 10.

The functions of femto base station 1 and the functions of mobile stations 4-1 and 4-2 that have been described hereinabove may also be executed by recording a program for realizing these functions on a recording medium that can be read by a computer and then causing a computer to read and execute the program that has been recorded on this recording by medium.

Although the invention of the present application has been described with reference to exemplary embodiments, the invention of the present application is not limited to the above-described exemplary embodiments. The constitution and details of the invention of the present application are open to various modifications within the scope of the invention of the present application that will be understood by one of ordinary skill in the art.

This application is the National Phase of PCT/JP2009/068673, filed Oct. 30, 2009, which claims priority based on Japanese Patent Application No. 2008-300960 for which application was submitted on Nov. 26, 2008 and incorporates all of the disclosures of that application.

What is claimed is:

1. A wireless station apparatus comprising:
   an antenna for which the direction of directivity can be adjusted;
   a communication unit that receives signals by way of said antenna;
   a detection unit that detects the direction of arrival of signals that are received by said communication unit;
   determination unit that determines whether the transmission origin of a signal that was received by said communication unit is a permitted wireless station apparatus for which connection is permitted or a nonpermitted wireless station apparatus for which connection is not permitted; and
   an adjustment unit that, based on signals received by said communication unit and determination results of said determination unit, finds the degree of interference of said permitted wireless station apparatuses and said nonpermitted wireless station apparatuses in the direction of arrival detected by said detection unit and adjusts the direction of directivity of said antenna according to the degree of interference that was found.

2. The wireless station apparatus as set forth in claim 1, wherein said adjustment unit finds, as said degree of interference, the reception frequency at which interference is received of, among signals from a direction of arrival that was detected by said detection unit, signals from transmission origins that are determined to be said nonpermitted wireless station apparatuses.

3. The wireless station apparatus as set forth in claim 1, wherein said adjustment unit finds, as said degree of interference, the reception frequency of, among signals from a direction of arrival that was detected in said detection unit, signals from transmission origins that are determined to be said permitted wireless station apparatuses.

4. The wireless station apparatus as set forth in claim 1, wherein said adjustment unit finds, as said degree of interference, each of the reception frequency of, among signals from a direction of arrival that was detected by said detection unit, signals from transmission origins that are determined to be said nonpermitted wireless station apparatuses and the reception frequency of, among signals from a direction of arrival that was detected in said detection unit, signals from transmission origins that are determined to be said permitted wireless station apparatuses.

5. The wireless station apparatus as set forth in claim 1, wherein said adjustment unit finds, as said degree of interference, the reception power at which interference is received of, among signals from the direction of arrival that was detected in said detection unit, signals from transmission origins that are determined to be said nonpermitted wireless station apparatuses.

6. The wireless station apparatus as set forth in claim 1, wherein said adjustment unit finds, as said degree of interference, the reception power at which interference is received of, among signals from the direction of arrival that was detected in said detection unit, signals from transmission origins that are determined to be said permitted wireless station apparatuses.

7. The wireless station apparatus as set forth in claim 1, wherein said adjustment unit finds, as said degree of interference, each of the reception power of, among signals from the direction of arrival that was detected in said detection unit, signals from transmission origins that are determined to be said nonpermitted wireless station apparatuses and the reception power of, among signals from the direction of arrival that was detected by said detection unit, signals from transmission origins that are determined to be said permitted wireless station apparatuses.

8. The wireless station apparatus as set forth in claim 2, wherein said adjustment unit adjusts the directivity of said antenna when said degree of interference is greater than a predetermined first threshold value.

9. The wireless station apparatus as set forth in claim 3, wherein said adjustment unit adjusts the directivity of said antenna when said degree of interference is smaller than a predetermined second threshold value.

10. The wireless station apparatus as set forth in claim 4, wherein said adjustment unit adjusts the directivity of said antenna when the reception frequency of signals from transmission origins that are determined to be said nonpermitted wireless station apparatuses is greater than a predetermined first threshold value and when the reception frequency of signals from transmission origins that are determined to be said permitted wireless station apparatuses is less than a predetermined second threshold value.

11. The wireless station apparatus as set forth in claim 7, wherein said adjustment unit adjusts the directivity of said antenna when the reception power of signals from transmission origins that are determined to be said nonpermitted wireless station apparatuses is greater than a predetermined first threshold value and when the reception power of signals from transmission origins that are determined to be said permitted wireless station apparatuses is less than a predetermined second threshold value.

12. The wireless station apparatus as set forth in claim 8, wherein said adjustment unit adjusts the direction of directivity of said antenna by decreasing by a predetermined amount the gain of said antenna for said direction of arrival.

13. The wireless station apparatus as set forth in claim 1, wherein:
said antenna has a transmission antenna for transmitting information and a reception antenna for receiving information; and
said adjustment means adjusts said transmission antenna or said reception antenna both said transmission antenna and said reception antenna.

14. The wireless station apparatus as set forth in claim 1, wherein:
said signals are connection request signals; and
when said transmission origin is determined by said determination unit to be said permitted wireless station apparatus, said communication unit communicates with said transmission origin.

15. The wireless station apparatus as set forth in claim 14, wherein:
when said transmission origin is determined to be said nonpermitted wireless station apparatus in said determination unit, said communication unit communicates with said transmission origin; and
when said transmission origin is determined to be said nonpermitted wireless station apparatus, said determination unit limits communication with said transmission origin.

16. The wireless station apparatus as set forth in claim 14, wherein:
when said transmission origin is a registered wireless station apparatus that has registered in advance, said determination unit determines that said transmission origin is said permitted wireless station apparatus, and when said transmission origin is not said registered wireless station apparatus, said determination unit determines that said transmission origin is not said permitted wireless station apparatus.

17. The wireless station apparatus as set forth in claim 14: wherein:
said determination unit: counts the number of wireless station apparatuses that are currently connected; determines that said transmission origin is said permitted wireless station apparatus when said number is less than or equal to a maximum number that is determined in advance; and
determines that said transmission origin is not said permitted wireless station apparatus when said number is greater than said maximum number.

18. The wireless station apparatus as set forth in claim 17, wherein:
when said number is less than or equal to said maximum number, said determination unit determines that said transmission origin is said permitted wireless station apparatus when said transmission origin is a registered wireless station apparatus that has registered in advance, and determines that said transmission origin is said permitted wireless station apparatus when said transmission origin is not said registered wireless station apparatus.

19. A wireless communication system that includes a first wireless station apparatus and a second wireless station apparatus, wherein:
said first wireless station apparatus comprises transmission unit that transmits signals; and
said second wireless station apparatus comprises:
an antenna for which the direction of directivity can be adjusted;
a communication unit that receives signals by way of said antenna;

a detection unit that detects the direction of arrival of signals that are received by said communication unit;

a determination unit that determines whether the transmission origins of signals that are received by said communication unit are permitted wireless station apparatuses for which connection is permitted or nonpermitted wireless station apparatuses for which connection is not permitted; and an adjustment unit that, based on signals received by said communication unit and determination results of said determination unit, finds the degree of interference of said permitted wireless station apparatuses and said nonpermitted wireless station apparatuses in the direction of arrival that was detected in said detection unit and adjusts the direction of directivity of said antenna according to the degree of interference that was found.

20. The wireless communication system as set forth in claim 19, wherein:

said transmission unit transmits connection request signals as said signals; and said adjustment unit calculates, as said degree of interference, at least one of the reception frequency of said connection request signals from transmission origins that are determined to be said permitted wireless station apparatuses and the reception frequency of said connection request signals from transmission origins that are determined not to be said permitted wireless station apparatuses.

21. The wireless communication system as set forth in claim 20, wherein:

said communication unit transmits a suppression instruction to suppress the transmission of said connection request signals of said first wireless station apparatus when said first wireless station apparatus is determined not to be said permitted wireless station apparatus in said determination unit;

said first wireless station apparatus includes reception unit that receives said suppression instruction, and halt unit that, upon reception of said suppression instruction by said reception unit, halts the transmission of said connection request signals by said transmission unit for a predetermined halt interval; and said adjustment unit calculates, as the reception frequency of said connection request signals, the number of receptions of said connection request signals by said communication unit during a totalization interval that is longer than said halt interval.

22. A wireless communication control method that is realized by a wireless station apparatus that includes an antenna for which the direction of directivity can be adjusted, comprising:

receiving signals by way of said antenna;

detecting the direction of arrival of signals that are received;

determining whether the transmission origin of signals that are received are permitted wireless station apparatuses for which connection is permitted or nonpermitted wireless station apparatuses for which connection is not permitted; and, based on said determination results and said signals, finding the degree of interference of said permitted wireless station apparatuses and said nonpermitted wireless station apparatuses in said direction of arrival that was detected and adjusting the direction of directivity of said antenna according to the degree of interference that was found.

23. The wireless communication method as set forth in claim 22, wherein, in said finding, the reception frequency at which interference is received of, among signals from said direction of arrival that was detected, signals from transmission origins that are determined to be said nonpermitted wireless station apparatuses is found as said degree of interference.

24. The wireless communication control method as set forth in claim 22, wherein, in said finding, the reception frequency at which interference is received of, among signals from said direction of arrival that was detected, signals from transmission origins that are determined to be said permitted wireless station apparatuses is found as said degree of interference.

25. The wireless communication control method as set forth in claim 22, wherein, in said finding, each of the reception frequency of, among signals from said direction of arrival that was detected, signals from transmission origins that are determined to be said nonpermitted wireless station apparatuses, and the reception frequency of, among signals from said direction of arrival that was detected, signals from transmission origins that are determined to be said permitted wireless station apparatuses are found as said degree of interference.

26. The wireless communication control method as set forth in claim 22, wherein, in said finding, the reception power at which interference is received of, among signals from said direction of arrival that was detected, signals from transmission origins that are determined to be said nonpermitted wireless station apparatuses is found as said degree of interference.

27. The wireless communication control method as set forth in claim 22, wherein, in said finding, the reception power at which interference is received of, among signals from said direction of arrival that was detected, signals from transmission origins that are determined to be said permitted wireless station apparatuses is found as said degree of interference.

28. The wireless communication control method as set forth in claim 22, wherein, in said finding, each of the reception power of, among signals from said direction of arrival that was detected, signals from transmission origins that are determined to be said nonpermitted wireless station apparatuses and the reception power of, among signals from said direction of arrival that was detected, signals from transmission origins that are determined to be said permitted wireless station apparatuses are found as said degree of interference.

29. The wireless communication control method as set forth in claim 23, wherein, in said finding, the directivity of said antenna is adjusted when said degree of interference is greater than a predetermined first threshold value.

30. The wireless communication control method as set forth in claim 24, wherein, in said finding, the directivity of said antenna is adjusted when said degree of interference is less than a predetermined second threshold value.

31. The wireless communication control method as set forth in claim 25, wherein, in said finding, the directivity of said antenna is adjusted when the reception frequency of signals from transmission origins that are determined to be said nonpermitted wireless station apparatuses is greater than a predetermined first threshold value and when the reception frequency of signals from transmission origins that are determined to be said permitted wireless station apparatuses is less than a predetermined second threshold value.

32. The wireless communication control method as set forth in claim 28, wherein, in said finding, the directivity of said antenna is adjusted when the reception power of signals from transmission origins that are determined to be said nonpermitted wireless station apparatuses is greater than a predetermined first threshold value and when the reception power of signals from transmission origins that are determined to be said permitted wireless station apparatuses is less than a predetermined second threshold value.

33. The wireless communication control method as set forth in claim 29, wherein, in said finding, the direction of directivity of said antenna is adjusted by decreasing by a predetermined amount the gain of said antenna for said direction of arrival.

34. The wireless communication control method as set forth in claim 22 wherein:
said antenna includes a transmission antenna for transmitting information and a reception antenna for receiving information; and
in said finding, said transmission antenna or said reception antenna is adjusted both said transmission antenna and said reception antenna is adjusted.

35. The wireless communication control method as set forth claim 22, wherein:
said signals are connection request signals; and
in said receiving, communication is carried out with said transmission origin when said transmission origin is determined to be said permitted wireless station apparatus.

36. The wireless communication control method as set forth in claim 35, wherein, in said receiving, communication is carried out with said transmission origin and said communication is limited when said transmission origin is determined to be said nonpermitted wireless station apparatus.

37. The wireless communication control method according to claim 35, wherein, in said determining, said transmission origin is determined to be said permitted wireless station apparatus when said transmission origin is a registered wireless station apparatus that has registered in advance, and said transmission origin is determined not to be said permitted wireless station apparatus when said transmission origin is not said registered wireless station apparatus.

38. The wireless communication control method as set forth in claim 35, wherein, in said determining, when the number of wireless station apparatuses currently connected is counted, said transmission origin is determined to be said permitted wireless station apparatus when said number is less than or equal to a maximum number that is determined in advance, and said transmission origin is determined not to be said permitted wireless station apparatus when said number is greater than said maximum number.

39. The wireless communication control method as set forth in claim 38, wherein, when said number is less than or equal to said maximum number in said determining, said transmission origin is determined to be said permitted wireless station apparatus when said transmission origin is a registered wireless station apparatus that has registered in advance, and said transmission origin is determined to be said permitted wireless station apparatus when said transmission origin is not said registered wireless station apparatus.

40. A non-transitory recording medium readable by computer and storing therein a program for causing a computer that is connected to an antenna for which the direction of directivity can be adjusted to execute: a communication process of receiving signals by way of said antenna; a detection process of detecting the direction of arrival of said signals that are received; a determination process of determining whether the transmission origins of said signals that are received are permitted wireless station apparatuses for which connection is permitted or nonpermitted wireless station apparatuses for which connection is not permitted; and an adjustment process for, based on the determination results and said signals, finding the degree of interference of said permitted wireless station apparatuses and said nonpermitted wireless station apparatuses in said direction of arrival that was detected and adjusting the direction of directivity of said antenna according to the degree of interference that was found.

41. The recording medium as set forth in claim 40, wherein, in said adjustment process, the reception frequency at which interference is received of, among signals from said direction of arrival that was detected, signals from transmission origins that are determined to be said nonpermitted wireless station apparatuses is found as said degree of interference.

42. The recording medium as set forth in claim 40, wherein, in said adjustment process, the reception frequency at which interference is received of, among signals from said direction of arrival that was detected, signals from transmission origins that are determined to be said permitted wireless station apparatuses is found as said degree of interference.

43. The recording medium as set forth in claim 40, wherein, in said adjustment process, each of the reception frequency of, among signals from said direction of arrival that was detected, signals from transmission origins that are determined to be said nonpermitted wireless station apparatuses and the reception frequency of, among signals from said direction of arrival that was detected, signals from transmission origins that are determined to be said permitted wireless station apparatuses are found as said degree of interference.

44. The recording medium as set forth in claim 40, wherein, in said adjustment process, the reception power of, among signals from said direction of arrival that was detected, signals from transmission origins that are determined to be said nonpermitted wireless station apparatuses is found as said degree of interference.

45. The recording medium as set forth in claim 40, wherein, in said adjustment process, the reception power of, among signals from said direction of arrival that was detected, signals from transmission origins that are determined to be said permitted wireless station apparatuses is found as said degree of interference.

46. The recording medium as set forth in claim 40, wherein, in said adjustment process, each of the reception power of, among signals from said direction of arrival that was detected, signals from transmission origins that are determined to be said nonpermitted wireless station apparatuses and the reception power of, among signals from said direction of arrival that was detected, signals from transmission origins that are determined to be said permitted wireless station apparatuses are found as said degree of interference.

47. The recording medium as set forth in claim 41, wherein, in said adjustment process, the directivity of said antenna is adjusted when said degree of interference is greater than a predetermined first threshold value.

48. The recording medium as set forth in claim 42, wherein, in said adjustment process, the directivity of said antenna is adjusted when said degree of interference is less than a predetermined second threshold value.

49. The recording medium as set forth in claim 43, wherein, in said adjustment process, the directivity of said antenna is adjusted when the reception frequency of signals from transmission origins that are determined to be said nonpermitted wireless station apparatuses is greater than a predetermined first threshold value and when the reception frequency of signals from transmission origins that are determined to be said permitted wireless station apparatuses is less than a predetermined second threshold value.

50. The recording medium as set forth in claim 46, wherein, in said adjustment process, the directivity of said antenna is adjusted when the reception power of signals from transmission origins that are determined to be said nonpermitted wireless station apparatuses is greater than a predetermined first threshold value and when the reception power of signals from transmission origins that are determined to be said permitted wireless station apparatuses is less than a predetermined second threshold value.

51. The recording medium as set forth in claim 47, wherein, in said adjustment process, the direction of directivity of said antenna is adjusted by decreasing by a predetermined amount the gain of said antenna for said direction of arrival.

52. The recording medium as set forth in claim 40, wherein:
said antenna includes a transmission antenna for transmitting information and a reception antenna for receiving information; and
in said adjustment process, said transmission antenna or said reception antenna or both said transmission antenna and said reception antenna is adjusted.

53. The recording medium as set forth in claim 40, wherein:
said signals are connection request signals; and
in said communication process, communication is carried out with said transmission origin when said transmission origin is determined to be said permitted wireless station apparatus.

54. The recording medium as set forth in claim 53, wherein, in said communication process, communication is carried out with said transmission origin and said communication is limited when said transmission origin is determined to be said nonpermitted wireless station apparatus.

55. The recording medium as set forth in claim 53, wherein, in said determination process, said transmission origin is determined to be said permitted wireless station apparatus when said transmission origin is a registered wireless station apparatus that has registered in advance, and said transmission origin is determined not to be said permitted wireless station apparatus when said transmission origin is not said registered wireless station apparatus.

56. The recording medium as set forth in claim 53, wherein, in said determination process, when the number of wireless station apparatuses that are currently connected is counted, said transmission origin is determined to be said permitted wireless station apparatus when said number is less than or equal to a predetermined maximum number, and said transmission origin is determined not to be said permitted wireless station apparatus when said number is greater than said maximum number.

57. The recording medium as set forth in claim 56, wherein, in said determination process, when said number is less than or equal to said maximum number, said transmission origin is determined to be said permitted wireless station apparatus when said transmission origin is a registered wireless station apparatus that has registered in advance, and said transmission origin is determined to be said permitted wireless station apparatus when said transmission origin is not said registered wireless station apparatus.

\* \* \* \* \*